US012697954B2

(12) United States Patent (10) Patent No.: US 12,697,954 B2
Kim (45) Date of Patent: Aug. 4, 2026

(54) ELECTRONIC BRAKE SYSTEM

(71) Applicant: HL MANDO CORPORATION, Gyeonggi-do (KR)

(72) Inventor: Jinseok Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 711 days.

(21) Appl. No.: 17/925,831

(22) PCT Filed: Mar. 25, 2021

(86) PCT No.: PCT/KR2021/003738
§ 371 (c)(1),
(2) Date: Nov. 17, 2022

(87) PCT Pub. No.: WO2021/194288
PCT Pub. Date: Sep. 30, 2021

(65) Prior Publication Data
US 2024/0217495 A1 Jul. 4, 2024

(30) Foreign Application Priority Data

Mar. 25, 2020 (KR) ........................ 10-2020-0036404

(51) Int. Cl.
*B60T 13/68* (2006.01)
*B60T 7/04* (2006.01)
(Continued)

(52) U.S. Cl.
CPC ............ *B60T 13/686* (2013.01); *B60T 7/042* (2013.01); *B60T 8/409* (2013.01); *B60T 13/142* (2013.01);
(Continued)

(58) Field of Classification Search
CPC ........ B60T 8/409; B60T 8/348; B60T 8/4018; B60T 8/4081; B60T 11/20; B60T 11/22;
(Continued)

(56) References Cited

U.S. PATENT DOCUMENTS 10,093,295 B2 10/2018 Kim et al.
10,513,249 B2 12/2019 Kim
(Continued)

FOREIGN PATENT DOCUMENTS

CN 203864681 10/2014
CN 104176032 12/2014
(Continued)

OTHER PUBLICATIONS

Extended European Search Report dated Mar. 21, 2024 for European Patent Application No. 21775335.9.
(Continued)

*Primary Examiner* — Robert A. Siconolfi
*Assistant Examiner* — San M Aung
(74) *Attorney, Agent, or Firm* — WOMBLE BOND DICKINSON (US) LLP

(57) ABSTRACT

Disclosed is an electronic brake system. The electronic brake system according to the present embodiment comprises: a first block in which a mechanical part that is mechanically operated and linked with a brake pedal is disposed; a second block in which an electronic part electronically operated and controlled by an electronic control unit is disposed; and a connection line which hydraulically connects the first block and the second block. The first block and the second block can be installed at positions spaced apart from each other in a vehicle, and thus the mountability of the brake system and the degree of freedom in designing the vehicle can be improved.

13 Claims, 2 Drawing Sheets

(51) Int. Cl.

| | |
|---|---|
| *B60T 8/40* | (2006.01) |
| *B60T 13/14* | (2006.01) |
| *B60T 13/62* | (2006.01) |
| *B60T 13/66* | (2006.01) |
| *B60T 13/74* | (2006.01) |
| *B60T 17/04* | (2006.01) |
| *B60T 17/22* | (2006.01) |

(52) U.S. Cl.
CPC ............ *B60T 13/145* (2013.01); *B60T 13/62* (2013.01); *B60T 13/662* (2013.01); *B60T 13/745* (2013.01); *B60T 17/04* (2013.01); *B60T 17/221* (2013.01); *B60T 2270/402* (2013.01); *B60T 2270/404* (2013.01); *B60T 2270/406* (2013.01)

(58) Field of Classification Search
CPC ...... B60T 7/042; B60T 13/142; B60T 13/145; B60T 13/662686; B60T 13/745; B60T 17/04; B60T 17/221; B60T 2220/04; B60T 2270/402; B60T 2270/404; B60T 2270/406
USPC ......................................................... 303/6.01
See application file for complete search history.

(56) References Cited

U.S. PATENT DOCUMENTS

| | | | |
|---|---|---|---|
| 2016/0009263 A1 | 1/2016 | Feigel et al. | |
| 2016/0031326 A1* | 2/2016 | Ueno ...................... | B60T 7/042 |
| | | | 303/3 |
| 2016/0185332 A1* | 6/2016 | Jeon ........................ | B60T 8/348 |
| | | | 303/9.61 |
| 2017/0072928 A1* | 3/2017 | Kim ........................ | B60T 7/042 |
| 2018/0118179 A1* | 5/2018 | Ko .......................... | B60T 7/042 |
| 2018/0339690 A1 | 11/2018 | Kim et al. | |
| 2018/0339692 A1* | 11/2018 | Jeong .................... | B60T 13/686 |
| 2019/0092300 A1* | 3/2019 | Jeong .................... | B60T 13/686 |
| 2019/0092302 A1 | 3/2019 | Jeong et al. | |
| 2019/0100179 A1* | 4/2019 | Lee ........................ | B60T 13/745 |
| 2019/0248348 A1 | 8/2019 | Ganzel et al. | |
| 2019/0275997 A1* | 9/2019 | Park ........................ | B60T 13/18 |
| 2019/0366997 A1* | 12/2019 | Jeong .................... | B60T 13/167 |
| 2019/0367000 A1* | 12/2019 | Lee ........................ | B60T 13/745 |

FOREIGN PATENT DOCUMENTS

| | | |
|---|---|---|
| CN | 107000718 | 8/2017 |
| CN | 107010024 | 8/2017 |
| CN | 110395234 | 11/2019 |
| CN | 110550008 | 12/2019 |
| JP | 2018-507820 | 3/2018 |
| KR | 10-2017-0031400 | 3/2017 |
| KR | 10-2018-0128187 | 12/2018 |
| KR | 10-2019-0037818 | 4/2019 |
| KR | 10-2019-0091987 | 8/2019 |
| KR | 10-2019-0096162 | 8/2019 |
| KR | 10-2019-0136210 | 12/2019 |

OTHER PUBLICATIONS

Office Action dated May 31, 2024 for Korean Patent Application No. 10-2022-7037310 and its English translation provided by Applicant's foreign counsel.
Office Action dated May 31, 2024 for Korean Patent Application No. 10-2022-7037312 and its English translation provided by Applicant's foreign counsel.
International Preliminary Report on Patentability (Chapter I) for PCT/KR2021/003738 issued on Sep. 22, 2022 and its English translation from WIPO (now published as WO 2021/194288).
International Search Report for PCT/KR2021/003738 mailed on Jul. 9, 2021 and its English translation from WIPO (now published as WO 2021/194288).
Written Opinion of the International Searching Authority for PCT/KR2021/003738 mailed on Jul. 9, 2021 and its English translation from WIPO (now published as WO 2021/194288).
Office Action (2nd) dated Feb. 25, 2025 for Korean Patent Application No. 10-2022-7037311 and its English machine translation provided by Applicant's foreign counsel.
Office Action (2nd) dated Feb. 6, 2025 for Korean Patent Application No. 10-2022-7037312 and its English machine translation provided by Applicant's foreign counsel.
Office Action (1st) dated Jan. 21, 2026 for Chinese Patent Application No. 202180038355.8 and its English translation provided by Applicant's foreign counsel/Google Translate.

* cited by examiner

ELECTRONIC BRAKE SYSTEM

TECHNICAL FIELD

The present invention relates to an electronic brake system and, more particularly, to an electric brake system for generating a braking force using an electrical signal corresponding to a displacement of a brake pedal.

BACKGROUND ART

Vehicles are essentially equipped with brake systems for carrying out braking, and various types of brake systems have been proposed for the safety of drivers and passengers.

Conventional brake systems have mainly used a way of supplying the wheel cylinder with the hydraulic pressure required for braking by means of a mechanically connected booster when a driver works a brake pedal. However, as the market demand for implementing various braking functions in close correspondence with the operating environment of a vehicle has increased, in recent years, an electronic brake system has been widely used in which a driver's braking intention is transmitted as an electrical signal from a pedal displacement sensor that senses the displacement of a brake pedal when the driver works the brake pedal, and based on this, a hydraulic pressure supply device is operated to supply the hydraulic pressure required for braking to a wheel cylinder.

Such an electronic brake system generates and provides an electrical signal to a driver's brake pedal actuation in normal operating mode or to a vehicle's autonomous braking stage, on the basis of this, the hydraulic pressure supply is electrically actuated and controlled to generate and transmit the required hydraulic pressure to the wheel cylinder. In this way, the electronic brake system and the operating method are electrically operated and controlled, so that various braking actions may be realized in a complex manner, but in the event of a technical problem with the electrical component, the hydraulic pressure required for braking is not reliably built up, which may pose a threat to passenger safety.

The electronic brake system thus enters an abnormal operating mode when a component is defective or corresponds to an uncontrollable state, wherein a mechanism is required in which a driver's brake pedal actuation must be directly linked to a wheel cylinder. Thus, in an abnormal operating mode of the electronic brake system, it is necessary for a driver to exert a braking force on a brake pedal, so that the hydraulic pressure required for braking is immediately built up and may be transferred directly into a wheel cylinder. Furthermore, there is a need for an accurate and quick check of the failure of the electronic brake system in order to quickly enter an abnormal operating mode in case of an emergency and to ensure the safety of a passenger.

Meanwhile, there is a problem in mounting the electronic brake system on a vehicle that the design freedom of the vehicle is limited by the size and installation position limits of the system module. Accordingly, there is a need for an efficient system module installation while maintaining the braking performance of a vehicle.

DETAILED DESCRIPTION OF THE INVENTION

Technical Problem

The present embodiment is to provide an electronic brake system capable of effectively implementing braking even in various operating situations.

The present embodiment is to provide an electronic brake system with improved performance and operational reliability.

The present embodiment is to provide an electronic brake system that may improve the design freedom of a vehicle.

The present embodiment is to provide an electronic brake system that may easily and efficiently perform installation and deployment of a vehicle.

The present embodiment is to provide an electronic brake system that reduces a load on component elements and thereby improves the durability of the product.

Technical Solution

According to an aspect of the present invention, there may be provided an electronic brake system comprising: a first block in which a mechanically operated mechanism part is arranged in cooperation with a brake pedal; a second block in which an electronic part that is electronically operated and controlled by an electronic control unit is arranged, and which is arranged spaced apart from the first block; and a connecting line for hydraulically connecting the first block and the second block to each other, wherein the mechanism part comprises a master cylinder including a first master piston connected to the brake pedal, a first master chamber whose volume is variable by a displacement of the first master piston, a second master piston which is provided so as to be displaceable by a hydraulic pressure in the first master chamber, and a second master chamber which is variable in volume by a displacement of the second master piston; the electronic part comprises a hydraulic control unit including a test valve, a pedal simulator, a hydraulic pressure supply device for generating hydraulic pressure by actuating a hydraulic piston by an electric signal, a first hydraulic circuit for controlling hydraulic pressure transmitted to two wheel cylinders, and a second hydraulic circuit for controlling the hydraulic pressure to be transmitted to other two wheel cylinders, and the connecting line comprises: a first connecting line having one end connected to the first master chamber and the other end connected to the side of the first hydraulic circuit; and a second connecting line having one end connected to the second master chamber and the other end branched and connected to each of the pedal simulator and the second hydraulic circuit side, wherein the test valve is provided at a front end of the branched point.

The mechanism part may further include a main reservoir in which a pressurizing medium is stored, the electronic part further comprises a sub-reservoir in which a pressurizing medium is stored, and the connecting line further comprises a third connecting line having one end connected to the main reservoir, and the other end connected to the sub-reservoir.

The other end of the second connecting line may branch into a simulation flow path connected to a front end of the pedal simulator, and a backup line connected to the second hydraulic circuit side, and the electronic part may further include a first cut valve provided in the first connecting line to control a flow of a pressurizing medium and a second cut valve disposed in the backup line and to control a flow of the pressurizing medium The electronic part may further include a simulator valve provided in the simulation flow path to control a flow of a pressurizing medium.

The electronic part may further include a first sub-reservoir flow path connecting the sub-reservoir and a rear end of the first hydraulic circuit, and a second sub-reservoir flow path connecting the sub-reservoir and a rear end of the second hydraulic circuit.

The electronic part may further include a simulator discharge flow path connected to a rear end of the pedal simulator, and the simulator discharge flow path may join the second sub-reservoir flow path and may be connected to the sub-reservoir.

The hydraulic pressure supply device may include a first pressure chamber provided in front of a hydraulic piston and a second pressure chamber provided in rear of the hydraulic piston.

The electronic part may further include a dump control part provided between the sub-reservoir and the hydraulic pressure supply device to control a flow of a pressurizing medium, and the dump control part may include a first dump control part for controlling a flow of a pressurizing medium between the first pressure chamber and the sub-reservoir, and a second dump control part for controlling a flow of a pressurizing medium between the second pressure chamber and the sub-reservoir.

The electronic part may further include a third sub-reservoir flow path connecting the sub-reservoir and the first dump control part, and a fourth sub-reservoir flow path connecting the sub-reservoir and the second dump control part.

The first hydraulic circuit may include a first inlet valve and a second inlet valve that control a flow of a pressurizing medium supplied from the hydraulic supply device to the first wheel cylinder and the second wheel cylinder, respectively, and a first outlet valve and second outlet valve that respectively control a flow of a pressurizing medium discharged from the first and second wheel cylinders, the second hydraulic circuit may include a third inlet valve and a fourth inlet valve for controlling a flow of a pressurizing medium supplied from the hydraulic pressure supply device to the third wheel cylinder and the fourth wheel cylinder, respectively, and a third outlet valve and a fourth outlet valve for respectively controlling a flow of a pressurizing medium discharged from the third and fourth wheel cylinders, the pressurizing medium discharged via the first and second outlet valves may be supplied to the first sub-reservoir flow path, and the pressurizing medium discharged via the third and fourth outlet valves may be supplied to the second sub-reservoir flow path.

The mechanism part may further include a first main reservoir flow path connecting the main reservoir and the first master chamber, and a second main reservoir flow path connecting the main reservoir to the second master chamber.

The first connecting line and the second connecting line may be provided as rigid pipes, and the third connecting line may be provided as an elastic hose.

The pedal simulator may include: a simulation piston that is provided so as to be displaceable by a hydraulic pressure of a pressurizing medium supplied from the simulation flow path, a simulation chamber of which volume is varied by the displacement of the simulation piston and which communicates with the simulator discharge flow path, and a simulation spring that elastically supports the simulation piston.

Advantageous Effects

An electronic brake system according to the present embodiment may stably and effectively implement braking in various operation situations of a vehicle.

An electronic brake system according to the present embodiment may improve the design freedom of a vehicle.

An electronic brake system according to the present embodiment may easily and efficiently perform installation and placement of a vehicle.

An electronic brake system according to the present embodiment may improve the performance and operational reliability of the product.

An electronic brake system according to the present embodiment may stably provide a braking pressure even when a component element is defective.

The present embodiment is to provide an electronic brake system which reduces a load on component elements and thereby improves the durability of the product.

MODE FOR CARRYING OUT THE INVENTION

Hereinafter, embodiments of the present invention will be described in detail with reference to the accompanying drawings. The following embodiments are presented to fully convey the scope of the invention to those skilled in the art. The present invention is not limited to the embodiments presented herein but may be embodied in other forms. The drawings may omit illustration of parts unrelated to the description for clarity of the invention, and may somewhat exaggerate the size of the components for ease of understanding.

Figure 1:
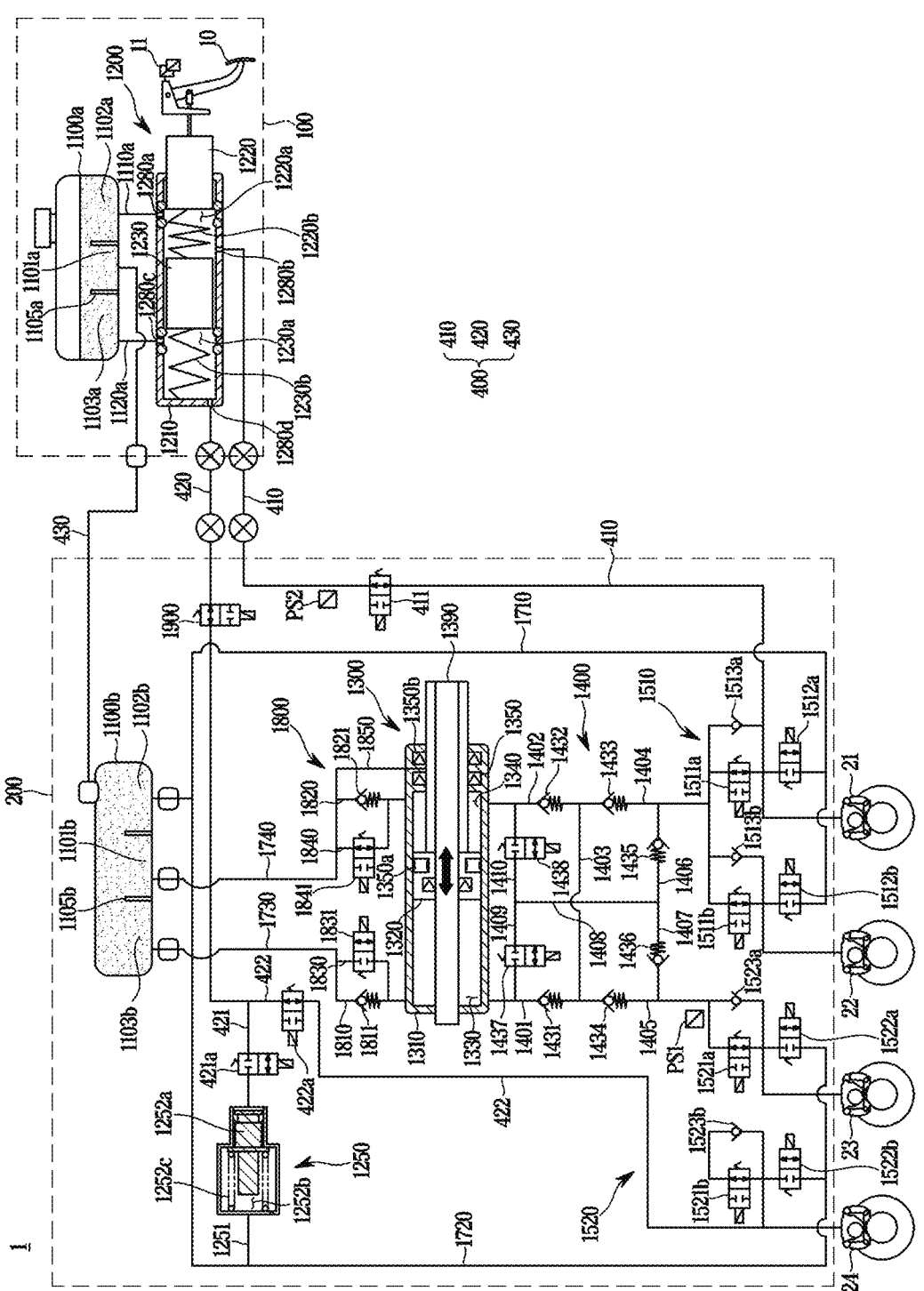
FIG. 1 is a hydraulic circuit diagram showing an electronic brake system according to a first embodiment of the present invention.

FIG. 1 is a hydraulic circuit diagram showing an electronic brake system 1 according to a first embodiment of the present invention.

Referring to FIG. 1, an electronic brake system 1 according to a first embodiment of the present invention may be provided including a first block 100 in which a mechanically operating mechanism part is arranged, a second block 200, in which an electronically operated and controlled electronic part is disposed, and a plurality of connecting lines 400 that hydraulically connect the first and second blocks 100 and 200 to each other.

The first block 100 is arranged with a mechanically operating mechanism in connection with and in conjunction with the brake pedal 10, and the second block 200 with an electronically operated and controlled electronics such as valves and sensors controlled in operation by an electronic control unit (not shown). The first block 100 and the second block 200 are arranged at a distance from each other on the vehicle and may be hydraulically connected by a plurality of connecting lines 400, whereby the vehicle mountability of the electronic brake system 1 is improved, and further, the design freedom of the vehicle may be achieved to enable efficient spatial arrangement.

The mechanism part includes components which, independently of the control signal of the electronic control unit, cooperate with the brake pedal 10 to perform a mechanical action and may be arranged in the first block 100.

The mechanism part may include a main reservoir 1100a in which a pressurizing medium such as brake oil is stored, a master cylinder 1200 for pressurizing and discharging the pressurizing medium, such as brake oil, housed inside in accordance with a pedal force of the brake pedal 10, and main reservoir flow paths 1110a and 1120a connecting the main reservoir 1100a and the master cylinder 1200.

The master cylinder 1200 may be configured to include at least one hydraulic chamber to pressurize and discharge an inner pressurizing medium. The master cylinder 1200 may include a first master chamber 1220a and a second master chamber 1230a, and first and second master pistons 1220 and 1230, which are provided in the respective master chambers 1220a and 1230a.

The first master chamber 1220a may be formed on the inlet side (right side with reference to FIG. 1) of the cylinder block 1210 to which the brake pedal 10 is connected, and a first master piston 1220 may be reciprocably received in the first master chamber 1220a.

In the first master chamber 1220a, the pressurizing medium may be introduced and discharged through the first hydraulic port 1280a and the second hydraulic port 1280b. The first hydraulic port 1280a is connected to a first main reservoir flow path 1110a to be described later, and pressurizing medium flows into the first master chamber 1220a from the main reservoir 1100a, and a pair of sealing members are provided on the front side (left side with reference to FIG. 1) and the rear side (right side with reference to FIG. 1) of the first hydraulic port 1280a so as to seal the first master chamber 1220a. The second hydraulic port 1280b is connected to a first connecting line 410, which will be described later, so that the pressurizing medium in the first master chamber 1220a may be discharged to the first connecting lines 410, or conversely, the pressurizing medium may be introduced from the first connecting line 410 into the first master chamber 1220a.

The first master piston 1220 is accommodated in the first master chamber 1220a, and may form a negative pressure in the interior of the first master chamber 1220a by pressurizing or backing up the pressurizing medium contained in the second master chamber. Specifically, when the first master piston 1220 is advanced, the pressurizing medium present in the interior of first master chamber 1220a may be pressurized to form a hydraulic pressure as the volume of first master chamber 1220a decreases. In contrast, as the volume of the first master chamber 1220a increases when the first master piston 1220 is moved back, the pressurizing medium present in the interior of the first master chamber 1220a may be depressurized and, at the same time, a negative pressure may be built up in the first master chamber 1220a.

The second master chamber 1230a may be formed on a front side (left side with reference to FIG. 1) of the first master chamber 1220a on the cylinder block 1210, and a second master piston 1230 may be reciprocably received in the second master chamber 1230a.

In the second master chamber 1230a, the pressurizing medium may be introduced and discharged through the third hydraulic port 1280c and the fourth hydraulic port 1280d. The third hydraulic port 1280c is connected to a second main reservoir flow path 1120a to be described later, and pressurizing medium flows into the second master chamber 1230a from the main reservoir 1100a, and a pair of sealing members are provided at the front side (left side with reference to FIG. 1) and the rear side (right side with reference to FIG. 1) of the third hydraulic port 1280c to seal the second master chamber 1230a. The fourth hydraulic port 1280d is connected to a 333 connecting line, which will be described later, so that the pressurizing medium in the second master chamber 1230a may be discharged to the 333 connecting line, or conversely, the pressurizing medium may flow from the 333 connecting line into the second master chamber 1230a.

The second master piston 1230 is accommodated in the second master chamber 1230a, and is capable of pressurizing the pressurizing medium which is accommodated in the second master chamber 1230a by advancing, or is capable of forming a negative pressure in the inside of the second master chamber 1230a by moving back. Specifically, when the second master piston 1230 is advanced, the pressurizing medium present in the interior of the second master chamber 1230a may be pressurized to form a hydraulic pressure as the volume of the second master chamber 1230a decreases. Meanwhile, when the second master piston 1230 is moved back, the pressurizing medium present in the interior of second master chamber 1230a may be depressurized as the volume of the second master chamber 1230a increases, and at the same time a negative pressure may be built up in second master chambers 1230a.

The first piston spring 1220b and the second piston spring 1230b are arranged to elastically support the first and second master pistons 1220, 1230, respectively. To this end, the first piston spring 1220b may be arranged between the front face (left end with reference to FIG. 1) of the first master piston 1220 and the rear face (right end with reference to FIG. 1) of the second master piston 1230, and the second piston spring 1230b is arranged between the front face of the second master piston 1230 and the inner side of the cylinder block 1210. When displacement occurs in the first master piston 1220 and the second master piston 1230 in response to an operation such as braking, the first piston spring 1220b and second piston spring 1230b are pressurized, respectively, and then when released from the operation of braking or the like, the spring force of the first and second pistons 1220 and 1230 expand and return to the original position, respectively.

The main reservoir 1100a may house and store the pressurizing medium inside. The main reservoir 1100a may be connected to the master cylinder 1200 and a component such as a third connecting line 430 described below to supply or receive the pressurizing medium.

The main reservoir 1100a may be provided divided into a plurality of chambers by a partition wall 1105a. The main reservoir 1100a includes a plurality of main reservoir chambers 1101a, 1102a, and 1103a, wherein the plurality of the main reservoir chamber 1101a, 1102a and 1103a may be arranged side by side in a row. Specifically, the main reservoir 1100a may be divided into a first main reservoir chamber 1101a disposed in the central portion, a second main reservoir chamber 1102a disposed at one side, and a third main reservoir chamber 1103a disposed at the other side.

The partition wall 1105a may be provided between adjacent main reservoir chambers, respectively, and each partition wall 1105a may be provided with at least a portion of the top open. As a result, the adjacent main reservoir chambers 1101a, 1102a, and 1103a communicate with each other so that the pressurizing medium may move. As an example, when a large amount of pressurizing medium is introduced into the first main reservoir chamber 1101a, the pressurizing medium may pass through the upper end of the partition wall 1105a to the second or third main reservoir chamber 1102a or 1103a.

The first main reservoir chamber 1101a may be connected with a third connecting line 430 to be described later to supply pressurizing medium to the sub-reservoir 1100b or may be supplied with pressurizing medium from a sub-reservoir 1100b, and the second main reservoir chamber 1102a is connected with the first main reservoir flow path 1110a to be discussed later and the third main reservoir 1103a is connected with second main-reservoir flow paths 1120a to supply or receive the pressurizing medium to the master cylinder 1200 side.

As described above, since the main reservoir 1100a is divided and provided in the first to third main reservoir chambers 1101a, 1102a, 1103a, stable operation of the electronic brake system 1 may be achieved. In one example, when the main reservoir 1100a is formed in one chamber and the amount of the pressurizing medium to be accommodated is not sufficient, the pressurizing medium cannot be stably supplied to the master cylinder 1200 side as well as to the sub-reservoir 1100b. Therefore, by separately providing the first main reservoir chamber 1101a connected to the sub-reservoir 1100b of the electronic part of the main reservoir 1300a and the second and third main reservoir chambers 1102a, 1103a connected with the side of the master cylinder 1200, it is possible to implement braking of the vehicle by supplying the pressurizing medium to one of the component elements even if it is impossible to supply the pressurizing medium to the other component element.

The main reservoir flow path is provided to hydraulically connect the master cylinder 1200 and the main reservoir 1100a.

The main reservoir flow path may include a first main reservoir flow path 1110a that connects the first master chamber 1220a and the second main reservoir chamber 1102a of the main reservoir 1100a, and a second main reservoir flow path 1120a that connects the second master chamber 1230a and the third main reservoir chamber 1103a of the main reservoir 1100a. To this end, one end of the first main reservoir flow path 1110a may communicate with the first master chamber 1220a of the master cylinder 1200, the other end may be in communication with the second main reservoir chamber 1102a of the main reservoir 1100a, one end of the second main reservoir flow path 1120a may communicate with the second master chamber 1230a of the master cylinder 1200, and the other end may communicate with the third main reservoir chamber 1103a of the main reservoir 1100a.

The electronic component includes components that are electronically operated and controlled by a control signal of an electronic control unit (ECU, not shown) and may be arranged in the second block 200.

The electronic part may include an electronic control unit, a sub-reservoir 1100b for adjunctively storing a pressurizing medium inside, a pedal simulator 1250 for supplying a reaction force to a driver's brake pedal 10, a hydraulic pressure supply part 1300 for receiving an electric signal of a driver's braking intension and generating hydraulic pressure of the pressurizing medium through a mechanical operation by a pedal displacement sensor 11 that detects the displacement of the brake pedal 10, a dump control part 1800 that hydraulically connects the sub-reservoir 1100b and the hydraulic pressure supply device 1300 and controls the flow of the pressurizing medium therebetween, a plurality of sub-reservoir flow paths 1710, 1720, 1730, 1740 connecting the sub-reservoir 1100b to the first and second hydraulic circuits 1510, 1520 and the dump control part 1800 side; a plurality of cut valves 411, 422a provided in the connection line to control the flow of the pressurizing medium, a test valve 1900 for testing the leak of the master cylinder 1200, a circuit pressure sensor PS1 for detecting the hydraulic pressure of the pressurizing medium provided by the hydraulic pressure supply device 1300, and a cylinder pressure sensor PS2 for detecting the hydraulic pressure of the first master chamber 1220a.

The sub-reservoir 1100b may be disposed in the second block 200 to secondarily store pressurizing medium. The auxiliary storage of the pressurizing medium in the electronic part by the sub-reservoir 1100b enables smooth supply and delivery of pressurizing medium even in electronic parts such as the hydraulic pressure supply device 1300, the dump control part 1800 and the first and second hydraulic circuits 1510, 1520.

The sub-reservoir 1100b may be connected to the main reservoir of the mechanism part 1200a by a third connecting line 430 described below. In addition, the sub-reservoir 1100b may be connected to the first hydraulic circuit 1510 and the second hydraulic circuit 1520, respectively, by the first sub-reservoir flow path 1710 and the second sub-reservoir flow path 1720, and may be coupled to the dump control part 1800 by the third sub-reservoir flow path 1730 and the fourth sub-reservoir flow path 1740.

The hydraulic pressure supply device 1300 is arranged to receive an electrical signal from a pedal displacement sensor which senses the displacement of the brake pedal 10 and to generate the hydraulic pressure of the pressurizing medium through mechanical actuation.

The hydraulic pressure supply device 1300 may include a hydraulic pressure supply part for supplying a pressure medium pressure to be transmitted to the wheel cylinder 20, a motor (not shown) for generating a rotational force by an electric signal of a pedal displacement sensor, and a power conversion part (not shown) for converting a rotational movement of the motor into a linear movement and transmitting the linear movement to the hydraulic pressure supply part.

The hydraulic pressure provision part includes a cylinder block 1310 in which a pressurizing medium is provided so as to be able to be accommodated, a hydraulic piston 1320 accommodated in the cylinder block, a sealing member 1250 provided between the hydraulic piston 1220 and the cylinder blocks 1130 to seal the pressure chambers 1430, 1440, and a drive shaft 1590 for transmitting the power output from the power conversion part to the hydraulic pistons 1220.

The pressure chambers 1330, 1240 may include a first pressure chamber 1130 located in front of the hydraulic piston 1320 (leftward of the hydraulic piston 1320 with reference to FIG. 1) and a second pressure chamber 1340 located in rear of the hydraulic piston 1320 (rightward of the fluid piston 430 with reference to FIG. 1). That is, the first pressure chamber 1330 is defined by the front surface of the cylinder block 1210 and the hydraulic piston 1420 so as to vary in volume according to the movement of the hydraulic pistons 1520, and the second pressure chambers 1340 are defined by a rear surface of each of the cylinders 1710, 1820.

The first pressure chamber 1330 is connected to a first hydraulic flow path 1401, which will be described later, via a first communication hole formed in the cylinder block 1210, and the second pressure chamber 1340 is coupled to a second hydraulic flow path 2402, which is described later.

The sealing member includes a piston sealing member 1350a provided between the hydraulic piston 1220 and the cylinder block 1410 to seal between the first pressure chamber 1330, and the second pressure chamber 1340, and a drive-shaft sealing member 1450b provided between a drive shaft 1690 of the cylinder 1710, to seal an opening of the second and cylinder blocks 1840. The hydraulic pressure or the negative pressure in the first pressure chamber 1330 and the second pressure chamber 1340 caused by the forward or backward movement of the hydraulic piston 1220 is sealed by the piston sealing member 1150a and the drive shaft sealing member 1250b so as not to leak, and may be transmitted to the first hydraulic flow path 1401 and to the second hydraulic flow path 1402 described later. In addition, a chamber sealing member 1350c may be provided between the second pressure chamber 1340 and the drive shaft sealing member 1450*b*, and the chamber sealing members 155*c* may allow the flow of the pressurizing medium flowing into the first pressure chamber 1440 through the auxiliary inflow path 1850, which will be described later, but may block the flow of the pressurizing medium leaking out of the second pressure chamber 1340 into the auxiliary outflow path 2550.

A motor not shown is provided to generate the driving force of the hydraulic piston 1320 by an electrical signal output from the electronic control unit ECU. The motor may include a stator and a rotor, thereby supplying power for generating displacement of the hydraulic piston 1320 by rotating in a forward or reverse direction. The rotational angular velocity and the rotational angle of the motor may be precisely controlled by a motor control sensor. Since the motor is a well-known technique, a detailed description thereof will be omitted.

A power conversion part not shown is provided to convert the rotational force of the motor into linear motion. As an example, the power converter may be provided with a structure including a worm shaft (not shown), a worm wheel (not shown), and a drive shaft 1390.

The worm shaft may be integrally formed with the rotational shaft of the motor, and a worm may be formed on the outer peripheral surface to engage the worm wheel to rotate the worm wheel. The worm wheel may be coupled to engage the drive shaft 1390 to linearly move the drive shaft 1390, which in turn is coupled to and integrally operates with the hydraulic piston 1320, thereby allowing the hydraulic piston 1320 to slide within the cylinder block 1310.

In other words, when the displacement of the brake pedal 10 is sensed by the pedal displacement sensor 11, the sensed signal is transmitted to the electronic control unit, which drives the motor to rotate the worm shaft in one direction. The rotational force of the worm shaft is transmitted to the drive shaft 1390 via the worm wheel, so that the hydraulic piston 1220 connected to the driving shaft may generate a hydraulic pressure in the first pressure chamber 1330 while advancing in the cylinder block 1510.

Conversely, when the tread force of the brake pedal 10 is released, the electronic control unit drives the motor to rotate the worm shaft in the opposite direction. Thus, the worm wheel may also rotate in the opposite direction and the hydraulic piston 1320 connected to the drive shaft 1290 may generate a negative pressure in the first pressure chamber 1330 while reversing in the cylinder block 1410.

The generation of the hydraulic pressure and the negative pressure in the second pressure chamber 1340 may be realized by operating in the opposite direction. That is, when the displacement of the brake pedal 10 is sensed by the pedal displacement sensor 11, the sensed signal is transmitted to the electronic control unit, which drives the motor to rotate the worm shaft in the opposite direction. The rotational force of the worm shaft is transmitted to the drive shaft 1390 via the worm wheel, so that the hydraulic piston 1220 connected to the driving shaft may generate a hydraulic pressure in the second pressure chamber 1340 while moving backward in the cylinder block 110.

On the other hand, when the tread force of the brake pedal 10 is released, the electronic control unit drives the motor in one direction to rotate the worm shaft in one direction. Thus, the worm wheel also rotates in the opposite direction and the hydraulic piston 1320 connected to the drive shaft 1390 may generate a negative pressure in the second pressure chamber 1340 while advancing in the cylinder block 1310.

As described above, the hydraulic pressure supply device 1300 may generate hydraulic pressure or negative pressure in each of the first pressure chamber 1330 and the second pressure chamber 1340 depending on the rotational direction of the worm shaft by driving the motor, and may determine whether to transmit hydraulic pressure to implement braking or to release braking using negative pressure by controlling the valves.

Meanwhile, the power conversion part according to the present embodiment is not limited to any structure as long as it may convert the rotational motion of the motor into the linear motion of hydraulic piston 1320, and it should be understood that the power conversion part is configured of various structures and systems.

The hydraulic pressure supply device 1300 may be hydraulically connected to the sub-reservoir 1100*b* by the dump control part 1800. The dump control part 1800 may include a first dump control part that controls the flow of pressurizing medium between the first pressure chamber 1330 and the sub-reservoir 1100*b*, and a second dump control part which controls the flow of the pressurizing medium between the second pressure chamber 1340 and the auxiliary reservoir 1120*b*. The first dump control part may include a first dump flow path 1810 that connects the first pressure chamber 1330 and the sub-reservoir 1100*b*, a first bypass flow path 1830 that branches and then re-merges on the first dump flow path 1810, and the second dump control part may include: a second dump flow path 1820 that links the second pressure chamber 1340 and the auxiliary reservoir 2102*b*, and a second bypass flow path 1840, which branches and subsequently re-joins the second dump flow path 1820.

A first dump check valve 1811 and a first dump valve 1831 that control the flow of the pressurizing medium may be provided in the first dump flow path 1810 and the first bypass flow path 1830, respectively. The first dump check valve 1811 may be arranged to allow only a flow of pressurizing medium from the sub-reservoir 1100*b* to the first pressure chamber 1330, and to block the flow of the pressurizing medium in the opposite direction The first dump flow path 1810 may be provided with a first bypass flow path 1830 connected in parallel to the first dump check valve 1811, and the first bypass flow path 1830 may have a first dump valve 1831 for controlling the flow of the pressurizing medium between the first pressure chamber 1330 and the sub-reservoir 1100*b*. In other words, the first bypass flow path 1830 may bypass and connect the front end and the rear end of the first dump check valve 1811 on the first dump flow path 1810, and it may be provided as a two-way solenoid valve that controls the flow of pressurizing medium between the first pressure chamber 1330 and the sub-reservoir 1100*b*. The first dump valve 1831 may be provided as a normally closed type solenoid valve that is normally in a closed state and operates to open the valve upon receiving an electrical signal from the electronic control unit.

A second dump check valve 1821 and a second dump valve 1841 that control the flow of the pressurizing medium may be provided in the second dump flow path 1820 and the second bypass flow path 1840, respectively. The second dump check valve 1821 may be arranged to allow only a flow of pressurizing medium from the sub-reservoir 1100*b* to the second pressure chamber 1330, and to block the flow of the pressurizing medium in the opposite direction The second dump flow path 1820 may be provided with a second bypass flow path 1840 connected in parallel to the first dump check valves 1721, and the second bypass flow path 1840 may include a second dump valve 1841 for controlling the flow thereof between the second pressure chamber 1330 and the sub-reservoir 1100*b*. In other words, the second bypass flow path 1840 may bypass and connect the front end and the rear end of the second dump check valve 1821 on the second dump flow path 1820, and the second dump valve 1841 may be provided as a two-way solenoid valve that controls the flow of pressurizing medium between the second pressure chamber 1330 and the sub-reservoir 1100*b*. The second dump valve 1841 may be provided as a normal open-type solenoid valve that is normally open and operates to close the valve upon receiving an electrical signal from the electronic control unit.

In addition, the dump control part 1800 may include an auxiliary inflow path 1850 that connects the sub-reservoir 1100*b* and the second pressure chamber 1340 so that the pressure medium may be filled in the first pressure chamber 1350. The auxiliary inflow path 1850 may be connected to the rear (right side with reference to FIG. 1) of the chamber sealing member 1350*c* on the cylinder body 1310. As a result, the pressurizing medium flows into the second pressure chamber 1340 from the sub-reservoir 1100*b* through the auxiliary inflow path 1850, and the flow of pressurizing medium leaking into the auxiliary outflow path 2840 through the chamber sealing member 2350*c* may be blocked.

The hydraulic control unit 1400 may be provided to control the hydraulic pressure delivered to each wheel cylinder 20, and the electronic control unit ECU is provided for controlling the hydraulic supply device 1300 and the various valves based on the hydraulic pressure information and the pedal displacement information.

The hydraulic control unit 1400 may include, among the four wheel cylinders 20, a first hydraulic circuit 1510 for controlling the flow of hydraulic pressure delivered to the first and second wheel cylinders 21, 22, and a second hydraulic circuit 1520 for controlling a flow of the hydraulic pressure transferred to the third and fourth wheel cylinder 23, 34, and includes a plurality of flow paths and valves for controlling hydraulic pressure delivered from the hydraulic pressure supply device 1300 to the wheel cylinder 30.

The first hydraulic flow path 1401 may be provided in communication with the first pressure chamber 1330, and the second hydraulic fluid line 1502 may be arranged in communication therewith. After merging into the third hydraulic flow path 1403, the first and second hydraulic flow paths 1201 and 1302 may be provided so as to be branched again into a fourth hydraulic flow path 2404 connected to the first hydraulic circuit 1510 and a fifth hydraulic flow paths 2505 connected to a second hydraulic circuit.

The sixth hydraulic flow path 1406 is provided to communicate with the first hydraulic circuit 1510, and the seventh hydraulic flow paths 1407 are provided to communication with the second hydraulic circuit. After merging into the eighth hydraulic flow path 1408, the sixth and seventh hydraulic flow paths 1406 and 1407 may be provided so as to be branched again into the ninth hydraulic flow path 1409 communicating with the first pressure chamber 1330, and the tenth hydraulic flow path 1410 communicating with the second pressure chamber 1340.

A first valve 1431 for controlling the flow of the pressurizing medium may be provided in the first hydraulic flow path 1501. The first valve 1431 may be provided as a check valve to allow flow of pressurizing medium from the first pressure chamber 1330, but to shut off flow of the pressurizing medium in the opposite direction. The second hydraulic flow path 1402 may also be provided with a second valve 1332 for controlling the flow of pressurizing medium, which may be provided as a non-return valve for allowing flow of the pressurizing medium out of the second pressure chamber 1340, but for blocking flow of pressurizing medium in the opposite direction.

The fourth hydraulic flow path 1404 is provided so as to be branched again from the third hydraulic flow paths 1303 in which the first hydraulic flow path 3101 and the second hydraulic flow paths 3202 join to each other and connected to a first hydraulic circuit 1510. A third valve 1433 for controlling the flow of the pressurizing medium may be provided in the fourth hydraulic flow path 1204. The third valve 1433 may be provided as a check valve that allows only the flow of pressurizing medium from the third hydraulic flow path 1303 to the first hydraulic circuit 1510 and blocks the flow of pressurizing medium in the opposite direction.

The fifth hydraulic flow path 1405 is provided so as to be branched again from the third hydraulic flow paths 1303 in which the first hydraulic flow path 3101 and the second hydraulic flow paths 3202 join to each other and connected to a second hydraulic circuit 1520. A fourth valve 1434 for controlling the flow of the pressurizing medium may be provided in the fifth hydraulic flow path 1505. The fourth valve 1434 may be provided as a check valve that allows only the flow of pressurizing medium from the third hydraulic flow path 1303 to the second hydraulic circuit 1520 and blocks the flow of pressurizing medium in the opposite direction.

The sixth hydraulic flow path 1406 is in communication with the first hydraulic circuit 1510, and the seventh hydraulic flow paths 1407 are provided so as to communicate with the second hydraulic circuit 1520 and to join with the eighth hydraulic flow path 1408. A fifth valve 1435 for controlling the flow of the pressurizing medium may be provided in the sixth hydraulic flow path 1406. The fifth valve 1435 may be provided as a check valve that allows only the flow of pressurizing medium discharged from the first hydraulic circuit 1510, and blocks the reverse pressurizing medium flow. Further, the seventh hydraulic flow path 1407 may be provided with a sixth valve 1436 for controlling the flow of the pressurizing medium. The sixth valve 1436 may be provided as a check valve that allows only the flow of pressurizing medium discharged from the second hydraulic circuit 1520, and blocks the reverse pressurizing medium flow.

The ninth hydraulic flow path 1409 is provided so as to be branched from the eighth hydraulic flow paths 1308 in which the sixth hydraulic flow path 1406 and the seventh hydraulic flow paths 1407 merge with each other and connected to the first pressure chamber 1330. A seventh valve 1437 for controlling the flow of the pressurizing medium may be provided in the ninth hydraulic flow path 1409. The seventh valve 1437 may be provided as a bi-directional control valve that controls the flow of the pressurizing medium delivered along the ninth hydraulic flow path 1409. The seventh valve 1437 may be provided as a normally closed type solenoid valve that is normally in a closed state and that operates to open the valve upon receiving an electrical signal from the electronic control unit.

The tenth hydraulic flow path 1410 is provided so as to be branched off from the eighth hydraulic flow path 1408 where the sixth and seventh hydraulic flow paths 1406, 1407 merge and connected to the second pressure chamber 1340. An eighth valve 1438 for controlling the flow of the pressurizing medium may be provided in the tenth hydraulic flow path 1410. The eighth valve 1438 may be provided as a bi-directional control valve that controls the flow of pressurizing medium delivered along the tenth hydraulic flow path 1410. The eighth valve 1438 may be provided as a normally closed type solenoid valve that is normally in a closed state and operates to open the valve upon receiving an electrical signal from the electronic control unit, similarly to the seventh valve 2437.

The hydraulic control unit 1400 may transmit the hydraulic pressure formed in the first pressure chamber 1330 to the first hydraulic circuit 1510 through the first, third, and fourth hydraulic lines 1601, 1703, and 1804 in sequence, and may transmit to the second hydraulic circuit 1520 through the second, fifth, and first hydraulic lines 1905 in sequence. In addition, the hydraulic pressure formed in the second pressure chamber 1340 in response to the backward movement of the hydraulic piston 1320 may be transmitted to the first hydraulic circuit 1510 through the second hydraulic flow path 1402 and the fourth hydraulic flow paths 1204 in sequence, and may be transferred to the second fluid circuit 1520 through the first, third, and fifth hydraulic oils 1102.

Conversely, as the hydraulic piston 1320 moves backward, the negative pressure formed in the first pressure chamber 1330 may recover the pressurizing medium provided to the first hydraulic circuit 1510 to the first pressure chamber 1330 sequentially via the sixth hydraulic flow path 1406, the eighth hydraulic flow path 1408, and the ninth hydraulic flow path 1409, and the pressurizing medium provided to the second hydraulic circuit 1520 to the first pressure chamber 1330 sequentially via the seventh hydraulic flow path 1407, the eight hydraulic flow path 1408, and the ninth hydraulic flow path 1409. In addition, as the hydraulic piston 1320 advances, the negative pressure formed in the second pressure chamber 1340 may recover the pressurizing medium provided to the first hydraulic circuit 1510 into the first pressure chamber 1330 in sequence through the sixth hydraulic flow path 1406, the eighth hydraulic flow paths 1408, and the tenth hydraulic flow path 1410, and recover the pressurizing medium provided by the second hydraulic circuit 1520 into the second pressure chamber 1340.

The first hydraulic circuit 1510 of the hydraulic control unit 1400 may control the hydraulic pressures of the first and second wheel cylinders 21, 22, which are two of the four wheels RR, RL, FR, FL, and the second hydraulic circuit 1520 is capable of controlling the hydraulic pressure of the third and fourth wheel cylinder 23, 24, which is the other two wheel cylinders.

The first hydraulic circuit 1510 is provided with the hydraulic pressure through the fourth hydraulic flow path 1404, and may discharge the hydraulic fluid through the sixth hydraulic flow path 1406. To this end, as shown in FIG. 1, the fourth hydraulic flow path 1404 and the sixth hydraulic flow path 1406 may be provided so as to be branched into two flow paths that are connected to the first wheel cylinder 21 and the second wheel cylinder 22 after merging. In addition, the second hydraulic circuit 1520 is provided with the hydraulic pressure through the fifth hydraulic flow path 1405, and is capable of discharging the hydraulic fluid through the seventh hydraulic flow paths 1407, and thus, as shown in FIG. 1, may be provided to be branched into two flow paths connected to the third wheel cylinder 23 and the fourth wheel cylinders 24 after the fifth and seventh hydraulic flow paths 1405, 1407 merge. However, the connection to the hydraulic fluid shown in FIG. 1 is not limited to this structure as an example to facilitate understanding of the present invention, and the same should be understood when the fourth hydraulic flow path 1404 and the sixth hydraulic flow path 1406 are connected to the first hydraulic circuit

1510 side, the first wheel cylinder 21 and the second wheel cylinder 22 are independently branched and connected, and similarly, the fifth and seventh hydraulic fluids 1405 and 1407 are connected, respectively, to the second hydraulic circuit 1520 and the third and fourth wheel cylinders 23 and 24 are independently branched and connected.

The first and second hydraulic circuits 1510, 1520 may include first to fourth inlet valves 1511a, 1511b, 1521a, 1521b, respectively, which control the flow of pressurizing medium towards the first to the fourth wheel cylinders 21, 22, 23, 24. The first to fourth inlet valves 1511a, 1511b, 1521a, 1521b are respectively arranged on the upstream side of the first to the fourth wheel cylinders 21, 22, 23, 24, and may be provided as normal open-type solenoid valves which are normally open and which operate to close the valves upon receiving an electrical signal from the electronic control unit.

The first and second hydraulic circuits 1510, 1520 may include first to fourth check valves 1513a, 1513b, 1523a, 1523b that are provided in parallel connection with reference to the first to the fourth inlet valves 1511a, 1511b, 1521a, 1521b. The first to fourth check valves 1513a, 1513b, 1523a, 1523b may be provided in a bypass flow path connecting the front and the rear of the first to the fourth inlet valves 1511a, 1511b, 1521a, 1521b on the first and the second hydraulic circuit 1410 and 4520, allowing only a flow of pressurizing medium discharged from each wheel cylinder, and blocking the flow of the pressurizing medium from the hydraulic supply device 1300 to the wheel cylinder. The hydraulic pressure of the pressurizing medium applied to each of the wheel cylinders may be quickly extracted by the first to fourth check valves 1513a, 1513b, 1523a, 1523b and, even when the first through fourth inlet valves 1511a, 1511b, 1521a, 1521b do not operate normally, the hydraulic pressure in the pressurizing medium applied to the wheel cylinder may be smoothly discharged.

The first hydraulic circuit 1510 may include first and second outlet valves 1612a, 1712b for regulating the discharge of pressurizing medium in order to improve performance when the first and the second wheel cylinders 21, 22 are released from braking. The first and second outlet valves 1512a, 1612b sense the brake pressure of the first and the second wheel cylinders 21, 22 and are selectively opened when a decompression brake such as an ABS dump mode is required, so as to discharge the pressurizing medium applied to the first and second wheel cylinders 21, 22 to the sub-reservoir 1100b through the first sub-reservoir flow path 1710 described later. The first and second outlet valves 1512a, 1612b may be provided as normally closed type solenoid valves that operate to open when they are normally closed and receive an electrical signal from the electronic control unit.

The second hydraulic circuit 1520 may include third and fourth outlet valves 1622a, 1722b for regulating the discharge of the pressurizing medium in order to improve the performance when releasing the braking of the third and the fourth wheel cylinders 23, 24. The third and fourth outlet valves 1522a, 1622b sense the brake pressure of the third and the fourth wheel cylinders 23, 24 and may be selectively opened when a decompression brake such as an ABS dump mode is required to discharge the pressurizing medium applied to the third and fourth wheel cylinders 23, 24 through the second sub-reservoir flow path 1720 described later. The third and fourth outlet valves 1522a, 1622b may be provided as normally closed type solenoid valves that operate to open when they are normally closed and receive an electrical signal from the electronic control unit.

The pedal simulator 1250 is arranged to provide a reaction force against a pedal force for actuation of the brake pedal 10 of the driver.

The pedal simulator 1250 has a front end connected to a simulation flow path 421 of a second connecting line 410 described later, and a rear end connected with the sub-reservoir 1100*b* by a simulator discharge flow path 1251.

The pedal simulator 1250 includes a simulator valve 421*a* provided in a simulation flow path 421 branched and connected to the second connecting line 430 to control a flow of a pressurizing medium, a simulation piston 1252*a* provided so as to be displaceable by the pressurizing medium flowing in through the simulation flow path 421, and a simulation chamber 1252*b* whose volume is varied by the displacement of the simulation piston 1252*a* and communicates with a simulator discharge flow path 1251 at a subsequent stage, and simulation spring 1252*c* that elastically supports the simulation piston 1252*a*.

The simulation flow path 421 may be branched at a second connecting line 410 described below and connected to the front end of the pedal simulator 1250. The simulator valve 421*a* may be provided in the simulation flow path 421 and control the flow of the pressurizing medium. The simulator valve 421*a* may be provided as a normally closed type solenoid valve which remains closed in the normal state, and when the driver applies a pedal force to the brake pedal 10, the simulator valve may open and transmit the pressurizing medium flowing from the second master chamber 1230*a* via the second connecting line 410 and the simulation flow path 421 to the front surface of the simulation piston 1252*a*.

The simulation piston 1252*a* is arranged to be displaceable in the simulation chamber 1252*b* by means of a pressurizing medium introduced via the second connecting line 420. Specifically, the hydraulic pressure of the pressurizing medium flowing through the simulation flow path 421 is transmitted to the front surface (right side surface with reference to FIG. 1) of the simulation piston 1252*a* to cause displacement of a simulation piston 1252*a*, and the pressurizing medium accommodated in the simulation chamber 1252*b* may be supplied to the sub-reservoir 1100*b* by the simulator discharge flow path 1251 while the volume of the simulation chamber 1252*b* formed on the rear surface (left side surface, with reference thereto) of a simulations piston 332*a* is reduced by the displacement of the simulation piston 1252*a*. The simulation spring 1252*c* is pressurized in accordance with the displacement of the simulation piston 1252*a* by elastically supporting the simulation piston 1252*a*, and an elastic restoring force may be provided to the driver as a pedal feel.

Meanwhile, in the drawing, simulation spring 1252*c* is shown as a coil spring as an example, but in addition, it may be of various structures as long as it may provide an elastic force and an elastic restoring force at the same time as it provides simulation piston 1252*a*. As an example, it may be made of a material such as rubber or may be composed of various members capable of storing an elastic force such as a leaf spring.

The simulator discharge flow path 1251 may be connected to a rear end of the pedal simulator 1250 such that one end communicates with the simulation chamber 1252*b* and the other end joins the second sub-reservoir path 1720 described later. Thus, by connecting the simulation chamber 1252*b* and the sub-reservoir 1100*b*, it is possible to supply the pressurizing medium discharged from the simulation chamber 1252*b* to the sub-reservoir 1100*b* or, conversely, to supply the pressurizing medium from the sub-reservoir 1100*b* to the simulation chamber 1252*b*.

Referring to the operation of the pedal simulator 1250, when the driver operates the brake pedal 10 to apply a tread force, the first master piston 1220 and the second master piston 1230 are advanced so that the pressurizing medium in a second master chamber 1230*a* is supplied and pressurized to the front surface of the simulation piston 1252*a* via a second connecting line 420 and a simulation flow path 421. To this end, the simulator valve 421*a* is opened. This causes the simulation spring 1252*c* to pressurize as a displacement occurs in the simulation piston 1252*a*, and the elastic restoring force of the simulation spring 1252*c* may be provided to the driver as a pedal feel. At this time, the pressurizing medium filled in the simulation chamber 1252*b* is transmitted to the sub-reservoir 1100*b* via the simulator discharge flow path 1251 and the second sub-reservoir path 1720. Then, when the driver releases the pedal force of the brake pedal 10, the simulation piston 1252*a* returns to the original position while the simulation spring 1252*c* expands due to the elastic restoring force, and the pressurizing medium that has pressurized the front surface of the simulation piston 1252*a* returns through the simulation flow path 421 and the second connecting line 420 to the second master chamber 1230*a*. The simulation chamber 1252*b* is supplied with a pressurizing medium from the sub-reservoir 1100*b* through the second sub-reservoir flow path 1720 and the simulator discharge flow path 1251 in this order, and the inside of the simulation chamber 1252*b* may be filled with the pressurizing medium again.

In this way, since the interior of the simulation chamber 1252*b* is always filled with the pressurizing medium, friction in the simulation piston 1252*a* is minimized during operation of the pedal simulator 1250, so that durability of the pedal simulator 1250 is improved, and entry of foreign matters from the outside may be blocked.

Meanwhile, the sub-reservoir 1100*b* may be provided by being partitioned into a plurality of chambers by the partition wall 1105*b*. The sub-reservoir 1100*b* includes a plurality of sub-reservoir chambers 101*b*, 1202*b*, and 1303*b*, wherein the plurality of the sub-reservoir chamber 1401*a*, 240*b* may be arranged side by side in a row. Specifically, the sub-reservoir 1100*b* may be divided into a first sub-reservoir chamber 101*b* disposed in the central portion, a second sub-reservoir chambers 1202*b* disposed on one side, and a third sub-reservoir space 1303*b* disposed at the other side.

A partition wall 1105*b* may be provided between adjacent sub-reservoir chambers, respectively, and each partition wall may be arranged such that at least a portion of an upper end thereof is open. As a result, the adjacent sub-reservoir chambers 1101*b*, 1202*b*, and 1303*b* communicate with each other so that the pressurizing medium may move. As an example, when a large amount of pressurizing medium is introduced into the first sub-reservoir chamber 1101*b*, the pressurizing medium may pass through the upper end of the partition wall 1105*b* and be delivered to the second or third sub-reservoir chamber 1102*b* or 1103*b*.

The first sub-reservoir chamber 1101*b* and the third sub-reservoir chamber 1103*b* may be connected to a first dump control part and a second dump control part, respectively, and the second sub-reservoir chamber is connected to the third connecting line 430 and the first and second hydraulic circuits 1510, 1520, which will be described later, so that pressurizing medium may be delivered to each other.

As described above, since the sub-reservoir 1100*b* is divided and provided in the first to third sub-reservoir chambers 1101*b*, 1102*b*, and 1103*b*, the electronic brake system 1 may be operated stably. In one example, when the sub-reservoir 1100b is formed of one chamber and the amount of pressurizing medium to be accommodated is insufficient, the pressurizing medium cannot be stably supplied to the side of the dump control part 1800 and the hydraulic pressure supply device 1300 as well as the main reservoir 1100a. Therefore, since the sub-reservoirs 1100b separately provide the first to third sub-reservoir chambers 1201b, 1302b, and 1403b, even if the pressurizing medium cannot be supplied to one component element, the vehicle may be braked by supplying the pressurizing medium to the other component element.

The sub-reservoir flow path is provided so as to hydraulically connect the first hydraulic circuit 1510, the second hydraulic circuit 1520, and the hydraulic pressure supply device 1300 to the sub-reservoir 1100b. The sub-reservoir flow path may include a first sub-reservoir flow path 1710 that connects the sub-reservoir 1100b and the rear end of the first hydraulic circuit 1510, a second sub-reservoir flow path 1720 that couples the sub-reservoir 1100b to the rear ends of the second hydraulic circuit 1520, a third sub-reservoir flow path 1730 to couple the sub-reservoir 1100b to the first dump control part, and a fourth sub-reservoir flow path 1740 for coupling the sub-reservoir 1100b and the second dump control part.

The first sub-reservoir flow path 1710 may have one end connected to the second sub-reservoir chamber 1102b of the sub-reservoir 1100b, and the other end connected downstream of the first and second outlet valves 1512a, 1612b in the first hydraulic circuit 1510. Further, one end of the second sub-reservoir flow path 1720 is connected to the second sub-reservoir chamber 1102b of the sub-reservoir 1100b, and the other end is connected downstream of the third and fourth outlet valves 1522a, 1622b in the second hydraulic circuit 1520, and a simulator discharge flow path 1251 may join the middle part. In addition, one end of the third sub-reservoir flow path 1730 may be connected to the third sub-reservoir chamber 1103b of the sub-reservoir 1100b, the other end thereof may be coupled to the first dump control part side, and the fourth sub-reservoir flow path 1740 may have one end thereof connected to a first sub-dump chamber 2101b of a sub-reservoir 1100b.

The test valve 1900 is provided to diagnose or determine whether the master cylinder 1200 leaks. The test valve 1900 is provided at the front end of the point where the simulation flow path 421 branches off on the second connecting line 420 described later, and may control the flow of the pressurizing medium. In the test mode, the test valve 1900 may check whether the master cylinder 1200 leaks by blocking the discharge of the pressurizing medium from the second master chamber 1230a through the second connecting line 420. To this end, the test valve 1900 may be provided as a normal open-type solenoid valve which is normally open and which operates to open the valve upon receiving an electrical signal from the electronic control unit.

The electronic part may include a circuit pressure sensor PS1 for sensing a hydraulic pressure of a pressurizing medium provided by the hydraulic pressure supply device 1300, and a cylinder pressure sensor PS2 for sensing hydraulic pressure in the first master chamber 1220a. The circuit pressure sensor PS1 is provided on the side of the second hydraulic circuit 1520, so as to sense the hydraulic pressure of the pressurizing medium generated and provided from the hydraulic supply device 1300 and transmitted thereto, and the cylinder pressure sensor PS2 is provided between the first master chamber 1220a and the first cut valve 411 on the first connecting line 410 described later, so that the pressurizing medium hydraulic pressure in the first master chamber 1220a may be sensed. The pressure value information of the pressurizing medium sensed by the circuit pressure sensor PS1 and the cylinder pressure sensor PS2 may be sent to the electronic control unit, which may perform a test mode or obtain traveling or braking information of a vehicle, based on the hydraulic pressure value sensed by a circuit pressure sensors PS1, and the hydraulic pressure value detected by the cylinder pressures sensor PS2.

Further, the electronic part may include a first cut valve 411 provided in a first connecting line 410 to be described later for controlling the flow of the pressurizing medium, and a second cut valve 422a provided in the backup line 422 of a second connecting line 420 to be discussed later for regulating the flow thereof. Details thereof will be described later.

The connecting line 400 is arranged to hydraulically connect the first block 100 of the mechanism part and the second block 200 of the electronic part, which are arranged at a distance from each other.

The connecting line 400 may include a first connecting line 410 that connects the master cylinder 1200 of the mechanism part to the first hydraulic circuit 1510 of the hydraulic control unit 1400, a second connecting line 420 that connects the master cylinder 1200 to the second hydraulic circuit 1520 and pedal simulator 1250 side of the hydraulic control unit 1400, and a third connecting line 430 that connects the main reservoir 1100a of the mechanism part and the electronic sub-reservoir 1100b of the electronic part to each other.

The first connecting line 410 may be connected at one end to the first master chamber 1220a of the master cylinder 1200, and at the other end to a downstream or rear end side of the first and second inlet valves 1511a, 1512a of a first hydraulic circuit 1510.

The first connecting line 410 is provided with a first cut valve 411 to control the flow of pressurizing medium between the first master chamber 1220a of the master cylinder 1200 and the first hydraulic circuit 1510. The first cut valve 411 may be provided as a normally open type solenoid valve which is normally open and which operates to close the valve when receiving a closing signal from the electronic control unit.

In the normal operating mode, which is a normal braking situation, the first cut valve 411 is controlled to be closed, so that the pressurizing medium contained in the first master chamber 1220a is not transmitted to the first hydraulic circuit 1510 side despite the tread force of the brake pedal 10. In addition, in the normal operation mode, the first cut valve 411 is controlled to be closed, so that the hydraulic pressure of the pressurizing medium provided in the hydraulic-pressure supplying device 1300 may be stably supplied toward the wheel cylinders 21, 22, 23, 24 without leaking to the master cylinder 1200 side along the first connecting line 410.

However, the first cut valve 411 is in the open state in the fallback mode, which is switched when the electronics are disabled, so that the pressurizing medium discharged from the first master chamber 1220a of the master cylinder 1200 may be supplied to the first and second wheel cylinders 21, 22 via the first connecting line 410 to implement braking.

The second connecting line 420 may be branched into a simulation flow path 421, one end of which is connected to the second master chamber 1230a of the master cylinder 1200, and the other end thereof connected to a front end of the pedal simulator 1250 and a backup line 422 connected to downstream or rear end sides of the third and fourth inlet valves 1521a, 1522a of a second hydraulic circuit 1520.

The backup line 422 is provided with a second cut valve 422a to control the flow of pressurizing medium between the second master chamber 1230a of the master cylinder 1200 and the second hydraulic circuit 1520. The second cut valve 422a may be provided as a normally open type solenoid valve which is normally open and which operates to close the valve when receiving a closing signal from the electronic control unit.

In the normal operating mode, which is the normal braking situation, the second cut valve 422a is controlled to be closed, so that the pressurizing medium contained in the second master chamber 1220a is not transmitted to the second hydraulic circuit 1520 side despite the tread force of the brake pedal 10. In addition, in the normal operation mode, the second cut valve 422a is controlled to be closed, so that the hydraulic pressure of the pressurizing medium provided in the hydraulic-pressure supplying device 1300 may be stably supplied toward the wheel cylinders 21, 22, 23, 24 without leaking to the master cylinder 1200 side along the backup line 422.

However, the second cut valve 422a is in the open state in the fallback mode, which is switched when the electronics are disabled, so that the pressurizing medium discharged from the second master chamber 1230a of the master cylinder 1200 may be supplied to the third and fourth wheel cylinders 23, 24 via the backup line 422 to implement braking.

The third connecting line 430 may be provided so that one end communicates with the main reservoir 1100a and the other end communicates therewith. The third connecting line 430 allows the delivery of the pressurizing medium between the reservoirs when there is too much or little pressurizing medium in one of the reservoirs, thereby allowing a smooth supply of pressurizing medium to each component.

The first and second connecting lines 410, 420 may be provided as pipes having a predetermined strength, and the third connecting line 430 as a hose having elasticity. The first and second connecting lines 410, 420 are provided with a pipe having a strength capable of withstanding the hydraulic pressure, through which the pressurizing medium formed with hydraulic pressure is transferred from the first and the second master chambers 1220a, 1230a, thereby achieving durability and performance of the product. Meanwhile, the third connecting line 430 is provided to be connected to the main reservoir 1100a or the sub-reservoir 1100b having an internal pressure of an atmospheric pressure level, and a pressurizing medium in which no hydraulic pressure is formed is delivered. Therefore, the first block 100 and the second block 200 may be provided with a hose or the like having elasticity so as to facilitate installation according to an arrangement position of the first block 100 and the second block 200. The first and second connecting lines 410, 420 may be installed on the vehicle body by a fastening member (not shown) having a predetermined restoring force so as to maintain connectivity despite an impact such as an accident of the vehicle.

Hereinafter, an electronic brake system 2 according to a second embodiment of the present invention will be described.

Figure 2:
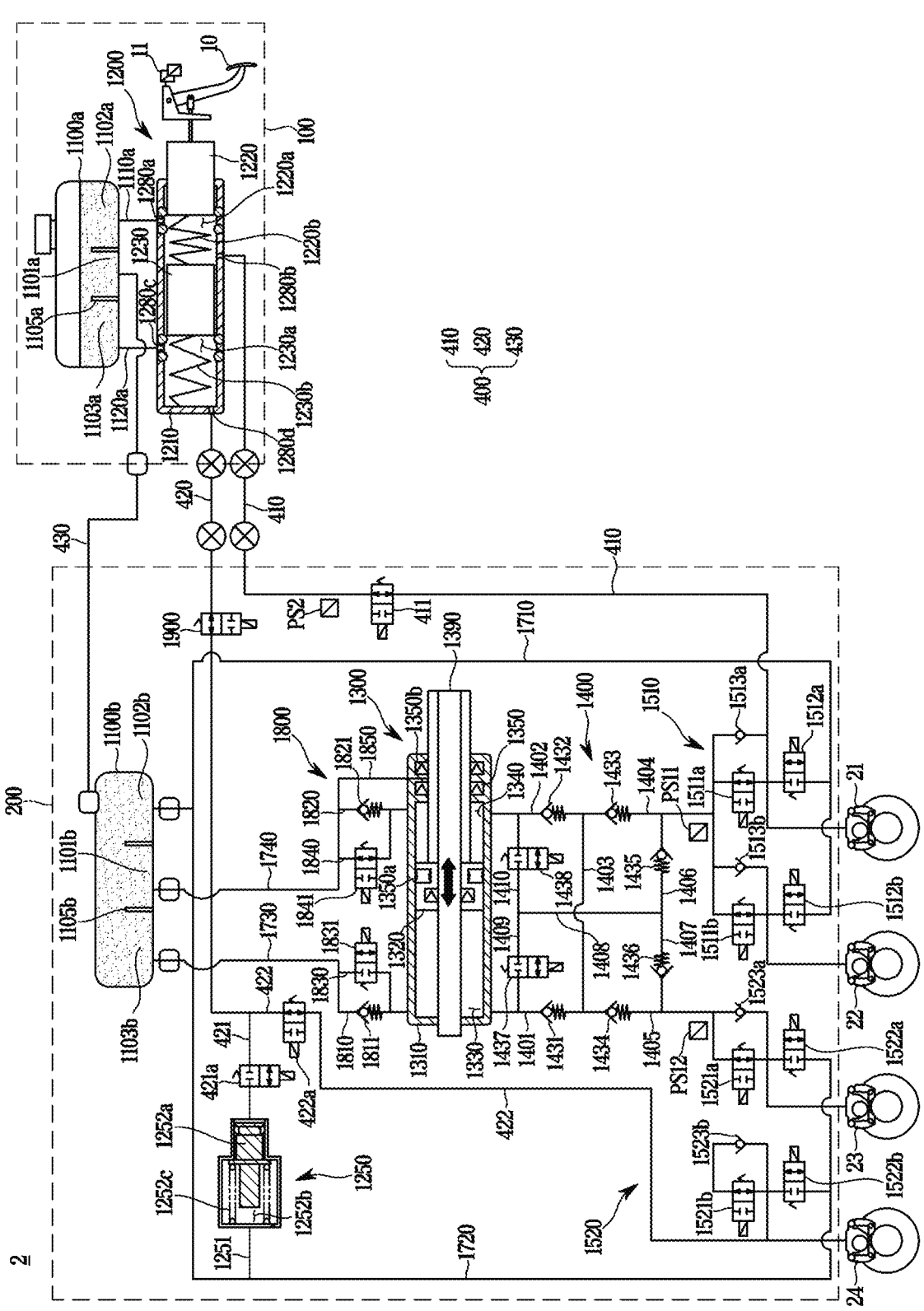
FIG. 2 is a hydraulic circuit diagram showing an electronic brake system according to a second embodiment of the present invention.

FIG. 2 is a hydraulic circuit diagram showing an electronic brake system 2 according to a second embodiment of the present invention, and with reference to FIG. 2, the electronic brake systems 2 of the second embodiment may further include a first circuit pressure sensor PS11 for sensing a hydraulic pressure of a pressurizing medium delivered to the first hydraulic circuit 1510 and a second circuit pressure sensors PS12 for sensing the hydraulic pressures of the pressurizing medium delivery to the second hydraulic circuit 1520.

The description of the electronic brake system 2 according to the second embodiment of the present invention described below is the same as that of the first embodiment of this invention described above except that it is further described with additional reference numerals, and the description is omitted to avoid duplication of content.

The first circuit pressure sensor PS11 may sense the hydraulic pressure of the pressurizing medium generated and provided from the hydraulic supply device 1300 and delivered to the first hydraulic circuit 1510, and send pressure value information to the electronic control unit. Further, the second circuit pressure sensor PS12 may sense the hydraulic pressure of the pressurizing medium generated and provided from the hydraulic supply device 1300 and transmitted to the second hydraulic circuit 1520, and send the pressure value information to the electronic control unit. The electronic control unit receives the hydraulic pressure value information of each hydraulic circuit from the first and second circuit pressure sensors PS11 and PS12, and may control the operation of the hydraulic supply device 1300 based thereon, thereby assisting autonomous driving and braking of the vehicle, such as highway driving assistance and emergency braking.

As an example, the first and second wheel cylinders 21, 22 provided in the first hydraulic circuit 1510 may be assigned to the left front wheel FL and the right rear wheel RR, respectively, and the third and fourth wheel cylinder 23, 24 provided in a second hydraulic circuit may be assigned (X-split) to a left rear wheel RL and a right front wheel FR, and a first circuit pressure sensor PS11 may sense and send the hydraulic pressure applied to the wheel cylinders of the left rear and right rear wheels, respectively. The electronic control unit automatically adjusts and controls the braking pressure of the vehicle based on the hydraulic pressure information of the wheel cylinders provided from the first circuit pressure sensor PS11 and the second circuit pressure sensor PS21, respectively, so as to assist the driver in driving.

The invention claimed is:

1. An electronic brake system comprising:
   a first block in which a mechanically operated mechanism part is arranged in cooperation with a brake pedal;
   a second block in which an electronic part that is electronically operated and controlled by an electronic control unit is arranged, and which is arranged spaced apart from the first block; and
   a connecting line for hydraulically connecting the first block and the second block to each other,
   wherein the mechanism part comprises a master cylinder including a first master piston connected to the brake pedal, a first master chamber whose volume is variable by a displacement of the first master piston, a second master piston which is provided so as to be displaceable by a hydraulic pressure in the first master chamber, and a second master chamber which is variable in volume by a displacement of the second master piston;
   the electronic part comprises a hydraulic control unit including a test valve, a pedal simulator, a hydraulic pressure supply device for generating hydraulic pressure by actuating a hydraulic piston by an electric signal, a first hydraulic circuit for controlling hydraulic pressure transmitted to first and second wheel cylinders, and a second hydraulic circuit for controlling the hydraulic pressure to be transmitted to third and fourth wheel cylinders, and the connecting line comprises:

a first connecting line having one end connected to the first master chamber and the other end connected to the side of the first hydraulic circuit; and a second connecting line having one end connected to the second master chamber and the other end branched and connected to each of the pedal simulator and the second hydraulic circuit side, wherein the test valve is provided at a front end of a branched point of the second connecting line where the second connecting line is branched to the pedal simulator and the second hydraulic circuit side, wherein the first hydraulic circuit comprises a first inlet valve and a second inlet valve that control a flow of a pressurizing medium supplied from the hydraulic supply device to the first wheel cylinder and the second wheel cylinder, respectively, and a first outlet valve and second outlet valve that respectively control a flow of a pressurizing medium discharged from the first and second wheel cylinders;

the second hydraulic circuit comprises a third inlet valve and a fourth inlet valve for controlling a flow of a pressurizing medium supplied from the hydraulic pressure supply device to the third wheel cylinder and the fourth wheel cylinder, respectively, and a third outlet valve and a fourth outlet valve for respectively controlling a flow of a pressurizing medium discharged from the third and fourth wheel cylinders;

the other end of the first connecting line connected to the side of the first hydraulic circuit is connected between the first inlet valve and the first outlet valve and is in direct communication with the first wheel cylinder; and the other end of the second connecting line connected to the side of the second hydraulic circuit is connected between the fourth inlet valve and the fourth outlet valve and is in direct communication with the fourth wheel cylinder.

2. The electronic brake system according to claim 1, wherein the mechanism part further comprises a main reservoir in which a pressurizing medium is stored, the electronic part further comprises a sub-reservoir in which a pressurizing medium is stored, and the connecting line further comprises a third connecting line having one end connected to the main reservoir, and the other end connected to the sub-reservoir.

3. The electronic brake system according to claim 2, wherein the other end of the second connecting line branches into a simulation flow path connected to a front end of the pedal simulator, and a backup line connected to the second hydraulic circuit side, and the electronic part further includes a first cut valve provided in the first connecting line to control a flow of a pressurizing medium and a second cut valve disposed in the backup line and to control a flow of the pressurizing medium.

4. The electronic brake system according to claim 3, wherein the electronic part further comprises a simulator valve provided in the simulation flow path to control a flow of a pressurizing medium.

5. The electronic brake system according to claim 4, wherein the electronic part further comprises a first sub-reservoir flow path connecting the sub-reservoir and a rear end of the first hydraulic circuit, and a second sub-reservoir flow path connecting the sub-reservoir and a rear end of the second hydraulic circuit.

6. The electronic brake system according to claim 5, wherein the electronic part further comprises a simulator discharge flow path connected to a rear end of the pedal simulator, and the simulator discharge flow path joins the second sub-reservoir flow path and is connected to the sub-reservoir.

7. The electronic brake system according to claim 5, wherein the hydraulic pressure supply device comprises a first pressure chamber provided in front of a hydraulic piston and a second pressure chamber provided in rear of the hydraulic piston.

8. The electronic brake system according to claim 7, wherein the electronic part further comprises a dump control part provided between the sub-reservoir and the hydraulic pressure supply device to control a flow of a pressurizing medium, and the dump control part comprises a first dump control part for controlling a flow of a pressurizing medium between the first pressure chamber and the sub-reservoir, and a second dump control part for controlling a flow of a pressurizing medium between the second pressure chamber and the sub-reservoir.

9. The electronic brake system according to claim 8, wherein the electronic part further comprises a third sub-reservoir flow path connecting the sub-reservoir and the first dump control part, and a fourth sub-reservoir flow path connecting the sub-reservoir and the second dump control part.

10. The electronic brake system according to claim 5, wherein: the pressurizing medium discharged via the first and second outlet valves is supplied to the first sub-reservoir flow path; and the pressurizing medium discharged via the third and fourth outlet valves is supplied to the second sub-reservoir flow path.

11. The electronic brake system according to claim 2, wherein the mechanism part further comprises a first main reservoir flow path connecting the main reservoir and the first master chamber, and a second main reservoir flow path connecting the main reservoir to the second master chamber.

12. The electronic brake system according to claim 2, wherein the first connecting line and the second connecting line are provided as rigid pipes, and the third connecting line is provided as an elastic hose.

13. The electronic brake system according to claim 6, wherein the pedal simulator comprises: a simulation piston that is provided so as to be displaceable by a hydraulic pressure of a pressurizing medium supplied from the simulation flow path, a simulation chamber of which volume is varied by the displacement of the simulation piston and which communicates with the simulator discharge flow path, and a simulation spring that elastically supports the simulation piston.

* * * * *